(12) United States Patent
Husveg

(10) Patent No.: US 9,650,862 B2
(45) Date of Patent: May 16, 2017

(54) FLOW AND FLUID CONDITIONING PRESSURE REDUCING VALVE OR DEVICE

(71) Applicant: Typhonix AS, Bryne (NO)

(72) Inventor: Trygve Husveg, Varhaug (NO)

(73) Assignee: Typhonix AS, Bryne (NO)

( * ) Notice: Subject to any disclaimer, the term of this patent is extended or adjusted under 35 U.S.C. 154(b) by 0 days.

(21) Appl. No.: 14/787,215

(22) PCT Filed: Apr. 28, 2014

(86) PCT No.: PCT/NO2014/050065
§ 371 (c)(1),
(2) Date: Oct. 26, 2015

(87) PCT Pub. No.: WO2014/178723
PCT Pub. Date: Nov. 6, 2014

(65) Prior Publication Data
US 2016/0084038 A1   Mar. 24, 2016

(30) Foreign Application Priority Data

Apr. 29, 2013 (NO) .................................. 20130583

(51) Int. Cl.
*F16K 47/12*   (2006.01)
*E21B 34/02*   (2006.01)
(Continued)

(52) U.S. Cl.
CPC .............. *E21B 34/02* (2013.01); *F16K 3/316* (2013.01); *F16K 47/02* (2013.01); *F16K 47/12* (2013.01)

(58) Field of Classification Search
CPC .......... E21B 34/02; F16K 47/02; F16K 3/316; F16K 47/12; F16K 47/08; F16K 3/32
(Continued)

(56) References Cited

U.S. PATENT DOCUMENTS 2,005,515 A   6/1935 Winkler
3,457,730 A   7/1969 Berry et al.
(Continued)

FOREIGN PATENT DOCUMENTS

EP   0167252 A1   1/1986
EP   0507584 A2   10/1992
(Continued)

OTHER PUBLICATIONS

Arlander, Bill, "International Search Report," prepared for PCT/NO2014/050065, as mailed Jun. 18, 2014, four pages.
(Continued)

*Primary Examiner* — John Bastianelli
(74) *Attorney, Agent, or Firm* — Winstead PC

(57) ABSTRACT

A flow and fluid conditioning pressure reduction device includes an inlet and an outlet. The pressure reduction device is distinctive in that it comprises at least one relatively long flow bore conduit shaped as a spiral or a spiral arranged on the surface of a cone or frustum. Each spiral shaped conduit includes at least one, preferably at least three rotations and each spiral shaped conduit preferably is closely packed; the conduit has been arranged between the inlet and the outlet, has reduced flow cross section area, and the length, the cross section area and the number of the spiral shaped conduits in line determine the pressure reduction of a given fluid at a given flow rate.

17 Claims, 4 Drawing Sheets

Figure 1:
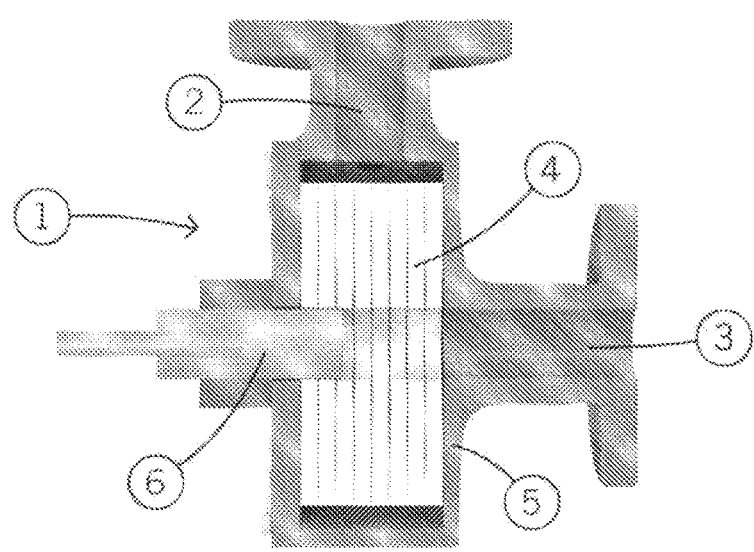

(51) Int. Cl.
 *F16K 3/316* (2006.01)
 *F16K 47/02* (2006.01)

(58) Field of Classification Search
 USPC .............. 137/625.3, 625.33, 625.37–625.39; 138/40–46; 251/126–127, 318
 See application file for complete search history.

(56) References Cited

U.S. PATENT DOCUMENTS

| | | | |
|---|---|---|---|
| 3,477,467 A | | 11/1969 | Sewell et al. |
| 3,514,074 A | * | 5/1970 | Self .................. F16K 47/08 251/127 |
| 3,851,526 A | * | 12/1974 | Drexel ................ G01F 5/00 138/42 |
| 3,977,435 A | * | 8/1976 | Bates .................. F16K 3/34 137/625.3 |
| 3,990,475 A | * | 11/1976 | Myers ................ F16K 3/34 137/625.38 |
| 4,044,991 A | | 8/1977 | Waller |
| 4,149,563 A | | 4/1979 | Seger |
| 4,256,284 A | | 3/1981 | Balhouse |
| 4,276,904 A | | 7/1981 | Jackson |
| 4,292,991 A | | 10/1981 | Wing |
| 4,407,327 A | * | 10/1983 | Hanson ................ F16K 47/08 137/625.37 |
| 4,510,993 A | | 4/1985 | Luetzelschwab |
| 4,617,991 A | | 10/1986 | Luetzelschwab |
| 5,341,848 A | | 8/1994 | Laws |
| 5,762,107 A | | 6/1998 | Laws |
| 5,971,604 A | | 10/1999 | Linga et al. |
| 6,644,620 B2 | * | 11/2003 | Johnson ................ B67D 3/045 251/126 |
| 6,701,957 B2 | * | 3/2004 | McCarty ................ F16K 47/04 137/625.3 |
| 6,782,920 B2 | * | 8/2004 | Steinke ................ F16K 47/08 137/625.3 |
| 6,981,689 B2 | * | 1/2006 | Mihaylov ............. F16K 47/12 251/126 |
| 2003/0034074 A1 | | 2/2003 | McCarty et al. |
| 2003/0188787 A1 | | 10/2003 | Steinke |
| 2010/0300542 A1 | * | 12/2010 | Haines ................ F16K 47/08 137/1 |
| 2010/0314325 A1 | | 12/2010 | Lean et al. |
| 2010/0314327 A1 | | 12/2010 | Lean et al. |
| 2011/0017306 A1 | | 1/2011 | Husveg |

FOREIGN PATENT DOCUMENTS

| | | |
|---|---|---|
| EP | 0520567 A1 | 12/1992 |
| EP | 0808425 A1 | 11/1997 |
| EP | 1188935 A2 | 3/2002 |
| EP | 1639285 B1 | 12/2007 |
| EP | 2042685 A1 | 4/2009 |
| EP | 1794483 B1 | 5/2011 |
| EP | 1831628 B1 | 5/2011 |
| EP | 2447466 A2 | 5/2012 |
| GB | 1268073 A | 3/1972 |
| NO | 20092006 A | 11/2010 |
| WO | WO-9310389 A1 | 5/1993 |
| WO | WO-9624774 A1 | 8/1996 |
| WO | WO-2007024138 A1 | 3/2007 |
| WO | WO-2008052275 A1 | 5/2008 |
| WO | WO-2009093035 A2 | 7/2009 |
| WO | WO-2010020741 A1 | 2/2010 |
| WO | WO-2012001671 A2 | 1/2012 |

OTHER PUBLICATIONS

Kwakernaak, Peter Jan, et al.; "Reduction of Oil Droplet Breakup in a Choke"; SPE 106693; SPE Production and Operations Symposium, Oklahoma, OK; Mar. 31-Apr. 3, 2007; 8 pages.

* cited by examiner

FLOW AND FLUID CONDITIONING PRESSURE REDUCING VALVE OR DEVICE

FIELD OF THE INVENTION

The invention relates to pressure reducing valves or other adjustable mechanical devices controlling the pressure or flow rate of a flowing fluid mixture while simultaneously conditioning the fluid or flow. Related prior art devices are throttling valves like choke and control valves for adjustable flow rate or pressure control. However, the valve or device of the invention has an enhanced fluid conditioning effect and enhanced flow conditioning effect, feasible for conditioning of shear sensitive fluid mixtures upstream separation or measurement equipment.

BACKGROUND OF THE INVENTION AND PRIOR ART

In many industries and applications various types of fluid and flow conditioners are used. Fluid and flow conditioners relevant for the invention are mechanical devices possessing an adjustable physical restriction to flow. Hence, common for fluid and flow conditioners relevant for the invention is that the conditioning process is accompanied by a reduction of the pressure of the flowing fluid. Sometimes adjustable throttling valves are used as flow and fluid conditioners.

A flow conditioner is herein defined as a device used to optimize the properties of the flow to achieve certain equipment, instrument or process benefits. Relevant for the invention are flow conditioners possessing a fixed or adjustable restriction to flow whereby the flow conditioning is accompanied by a fluid pressure drop. For example, flow conditioners are sometimes used to enable accurate measurements of the rate of flow of a fluid passing along a pipe by stabilizing the flow and removing non-uniformities which affects both mean flow and turbulence structure. Typical examples of such flow conditioners are U.S. Pat. No. 5,341,848, U.S. Pat. No. 5,762,107, EP 1188935 A2 and EP 0808425 A1. Other flow conditioners may be used to reduce cavitation or erosion effects of a flow, like the device described in EP 2447466 A2.

A fluid conditioner is herein defined as a device used to optimize the properties of the fluid to achieve certain equipment, instrument or process benefits. Fluid conditioners come in numerous variants like for example heaters, coolers, coalescers, mixers and separators. Relevant for the invention are fluid conditioners possessing a fixed or adjustable restriction to flow whereby the fluid conditioning is accompanied by a fluid pressure drop. Examples of fluid conditioners are described in US 2010/0314327 A1, US 2010/0314325 A1 and U.S. Pat. No. 2,005,515.

Throttle valves are adjustable mechanical devices often installed with the main objective to control or regulate the flow rate or pressure of a flowing fluid. In performing the main duty, however, conditioning of the fluid or flow is often side effects. Sometimes the fluid conditioning effect is a wanted effect and an effect very important for a downstream process or equipment. Examples of such valves and applications are EP 1831628 B1 and U.S. Pat. No. 3,457,730 describing so-called Joule-Thompson valves where the gas cooling effect, due to the valve pressure drop, is very important for downstream processes. Another example is when a throttling valve is used as a fluid mixer, like in U.S. Pat. No. 5,971,604, where the mixing effect is the wanted effect and where the pressure drop is a side effect.

Most often however, the fluid and flow conditioning effects caused by a throttling valve are unwanted and uncontrolled, causing problems for the valve itself or for the downstream piping, process or equipment. Examples of such are many and particularly found in petroleum production and processing where the use of throttling valves is widespread. Choke and control valves are throttling valves where the main duty normally is to control the flow rate or pressure of a flowing fluid. Choke and control valves may have both wanted and unwanted flow and fluid conditioning effects.

Choke valves are used at wellheads in order to choke the well flow and to regulate the production rate of the petroleum fluids. Typical reasons for using a choke valve is to avoid sand production or too high water cut in the flow from the well, in which situations choking the valve can reduce sand production or high water cut. However, a typical choke valve has a high shear, mixing and droplet breaking effect on the fluid, which can be a disadvantage for subsequent processing.

The fluid from a wellhead is typically routed to a first stage separator, where the fluid is separated into gas, oil or condensate and water. The phases oil or condensate, water and gas are typically processed further. For example, the oil or condensate should be clean enough for transportation and further use in refineries and for other purposes, the gas should be dry and clean enough for export or sale and the water should be clean enough for dumping or reinjection.

Between processing steps, it can be required to have flow or pressure control valves or devices. A problem not receiving much attention is the effect of flow or pressure control valves upstream separation equipment. The effect is often that droplets in the flowing fluid are broken up into smaller droplets and the different phases in the flow are mixed thoroughly. However, this has the effect of reducing the efficiency of downstream separation equipment.

Sometimes when throttling valves are used in subsea petroleum applications there is a transportation pipeline downstream from the valve. The transportation pipeline may lead to either a subsea or topside separation process system, where the location of the separation process may be distant from the valve. Because of the mixing and emulsifying effect of the throttling valve the fluid mixture may have an increased viscosity, which increases the resistance of the fluids to flow. With a higher fluid viscosity the pressure loss in the transportation pipeline increases. Hence, due to the emulsification effect the valve may increase the energy requirement in connection with downstream transportation.

Typical prior art pressure reduction valves are needle valves or valves of similar designs with a valve element that can be moved toward or from a seat, diaphragm and spring valves, gate valves, ball valves and plug-cage valves. A typical plug-cage choke or control valve may comprise two longitudinally coaxial elements movable relatively to each other and with the cage having a number of bores which the plug match/block or not so as to regulate the choking effect by adjusting the effective flow bore cross section area, such as described in patent publications WO 2010020741 A1, WO 2009093035 A2 and WO 2007024138 A1.

The prior art throttling valves are often small in size and weight, which is considered an advantage and therefore is pursued.

Common for prior art throttling valves like choke and control valves is that the flow rate or pressure control is accompanied by a reduction of the pressure of the flowing fluid. The reduction in pressure implies that turbulence and shear forces are created within the flow of the valve and the turbulence and shear forces have a conditioning effect on both the fluid and the flow. Typically, the fluid and flow conditioning effects are not beneficial and the fluid and flow conditioning effects are not controlled.

A demand exist for a pressure reduction valve or device having a controlled flow conditioning effect, or a pressure reduction valve or device having a controlled fluid conditioning effect, or a pressure reduction valve or device having both controlled flow and fluid conditioning effects.

Hence, a demand exist for a combined throttling valve and fluid conditioner, or a combined throttling valve and flow conditioner or a combined throttling valve, fluid conditioner and flow conditioner, optimizing the duty of the valve itself whilst providing benefits for downstream process steps or equipment efficiency.

A demand exists for a pressure reduction valve or device having a droplet coalescing effect on droplets in a flowing fluid phase, preferably having a coalescing effect in many modes of operation, dependent on the incoming fluid and required pressure reduction. Such valve would be beneficial for use upstream separation equipment, and the objective of the invention is to provide such valve.

Reduced degradation of polymer solutions or other shear sensitive fluids is a further desired effect of the present invention. In many applications shear sensitive fluids are throttled across a choke or control valve where the throttling causes a degradation of the shear sensitive fluids. One example of such application is the use of polymers in enhanced oil recovery operations where water is injected to the reservoir. The injection water may be produced water, co-produced with oil and gas from the reservoir, or seawater. The water is injected to flood oil from injection wells towards production wells of the reservoir. To increase the flooding efficiency polymers are sometimes added to the water to increase the water viscosity. One challenge is then that the polymers, which often are long-chained molecules like hydrolyzed polyacrylamide, are broken in injection choke valves. To accommodate this problem many different solutions have been developed. U.S. Pat. No. 4,276,904 describes an adjustable device based on tubes arranged as coils for controlling the flow rate and pressure of polymer solutions. WO2012001671 reveals also a tube based, adjustable throttling device, but where the tubes are a parallel arrangement rather than coils. Paper SPE 106693 describes laboratory test results of a similar solution then used to reduce the breaking of oil droplets in a water flow. Other solutions to reduce degradation of polymers during adjustable flow control are provided by U.S. Pat. No. 4,510,993, U.S. Pat. No. 3,477,467 and U.S. Pat. No. 4,617,991.

SUMMARY OF THE INVENTION

The invention provides a flow and fluid conditioning pressure reduction valve or device, comprising an inlet and an outlet, the valve or device is distinctive in that it comprises at least one relatively long flow bore conduit shaped as a spiral or a spiral arranged on the surface of a cone or frustum. Each spiral shaped conduit includes at least one, preferably at least three rotations and each spiral shaped conduit preferably is closely packed; the conduit has been arranged between the inlet and the outlet, has reduced flow cross section area, and the length, the cross section area and the number of the spiral shaped conduits in line determine the pressure reduction of a given fluid at a given flow rate.

The term at least one relatively long flow bore conduit, means longer, preferably several times longer, conduit or conduits compared to typical prior art valves or devices. The typical conduit length of prior art valves or devices, is typical in the range 1 to 20 mm. Each spiral shaped conduit of the invention is preferably at least 0.1 m, more preferably at least 0.2 m, most preferably at least 0.5 m. At least one conduit means one or several conduits, the conduits can be coupled in fluid communication between the inlet and the outlet, which means they are in line, coupled in series or in parallel. That the conduit has reduced flow cross section area, means relative to upstream and/or downstream nominal pipe flow and/or inlet and outlet cross section area. Valve and device are in substance synonymous in this context, however, a valve can be closed but not necessarily a device.

The technical effect of the valve or device of the invention is one, several or all of the features as follows:
Fluid Conditioning
  Reduced droplet breaking
  Increased droplet coalescence
  Increased segregation of solid particles
  Reduced degradation of polymer solutions or other shear sensitive fluids
Flow Conditioning
  Reduced velocity and turbulence instabilities
  Reduced cavitation and cavitation erosion
  Reduced noise and vibration
  Reduced particle erosion A relatively long, small cross section area flow bore conduit, as compared to prior art choke and pressure reduction valves, provides frictional pressure drop along the conduit, whilst fluid shearing, droplet breaking, mixing of phases, erosion, cavitation and noise are minimized. What this means in practice will be clear from the following description.

In a preferable embodiment, a number of spiral shaped conduits are packed close together, forming a spiral stack, and the spirals are preferably arranged as parallel conduits, alternatively the spirals are connected in series. In another preferable embodiment, a number of conduits shaped as a spiral on a right circular cone or frustum surface are packed close together, forming a cone stack of spirals, and the spirals are preferably arranged as parallel conduits, alternatively the spirals are connected in series. A spiral is a two dimensional geometrical structure, except of the height of the conduits in this context. A spiral arranged on the surface of a cone or frustum can be called a conical spiral or a conical helix. The spiral shaped or spiral like conduits of the invention provide a surprisingly beneficial combination of pressure reduction combined with low shear, low droplet break up and low mixing, in a compact design. Additionally, the valve or device provides a coalescing effect of a flowing fluid with dispersed droplets of a first phase in a continuous second phase, depending on operating conditions and the condition of the incoming fluid.

The valve or device of the invention provides an optimized, controlled or reduced level of turbulence or shear rate, depending on the requirements of the application. Particularly, the valve or device of the invention is designed to provide a level of turbulence or shear rate which is optimal for a given application. In some applications this means to avoid flow turbulence levels and shear rates above a certain limit to avoid or reduce fluid degradation or the mixing of phases of a flowing fluid. In other applications this means that the flow turbulence levels and shear rates are optimized or even increased to achieve certain flow conditioning effects like homogenization of fluid phases, mixing or blending of chemicals into fluid phases or to promote coalescence of droplets of a dispersed fluid phase in a continuous fluid phase.

When considering droplets of a first fluid phase dispersed in a second continuous fluid phase like an oil-in-water emulsion or water-in-oil emulsion, the valve or device of the invention can be designed to provide a certain equilibrium droplet size. The equilibrium droplet size will be a combined function of the conditions of the fluid and conditions of the spiraling flow. Particularly, the valve or device of the invention has a larger equilibrium droplet size than prior art pressure reduction valves. The term equilibrium droplet size means that the droplet size of the incoming fluid will increase over the valve if the droplet size of the inlet flow is smaller than the equilibrium droplet size.

Without wishing to be bound by theory the coalescing effect of a valve or device according to the invention is assumed to be a combination of several mechanisms. Firstly, the dispersed phase droplets are let to collide due to the turbulence of the spiraling flow where the level of turbulence and thereby the collision rate depends on conditions of both the spiral conduit and the flowing fluid. Secondly, in the spiraling flow, centrifugal forces will act on the phases of fluids forcing the heavier phase towards the outer periphery and the lighter phase towards the inner periphery of the spiral conduit. Flowing through the spiral, therefore, the concentration of the dispersed phase may increase in inner or outer parts of the dross sectional area of the spiraling conduit, depending on the densities of the respective fluid phases. In a preferable embodiment, the conduit cross section area increases toward the outlet, so as to enhance the coalescing effect of the valve by reducing the friction on the fluid.

For some embodiments of the invention, it is beneficial to continuously, gradually or stepwise increase the flow cross section area of the spiral conduit for fluid flowing from the inlet to the outlet end of a conduit spiral. This is both when the spiraling flow is radially inwards and outwards of a spiral arranged on a disc or frustum. An increase in flow cross section area of the spiral conduit is particularly relevant in cases where droplets of a fluid are let to coalesce within the spiraling flow and where an enlargement of cross section area along the spiral conduit allows droplets to reach a larger equilibrium droplet size due to a lower level of turbulence. An enlargement of cross section area along the spiral conduit is also beneficial in cases where gas is released from the flow due to the pressure let down, and where the released gas causes the spiral flow velocities to increase, then an increase in conduit flow cross section area is used to offset the increase in spiral flow velocities and thereby to allow for a constant or increasing equilibrium droplet size In another preferable embodiment, the conduit of reduced cross section area for pressure reduction, in the direction of flow goes from inside the spiral to outside the spiral, providing reduced centripetal acceleration to the fluid and thereby slightly increased coalescing effect, whilst conduit sections connecting the outer end of a conduit spiral to the inner end of the next conduit spiral has increased cross section area for increased coalescing effect. The notation inside and outside the spiral refers to the radial position relatively to a spiral arranged on a disc or frustum. Alternatively, the spirals are coupled directly so that the flow direction is alternately outward and inward, which is beneficial for providing a compact valve.

Preferably, the valve comprises a central control element adjustable so as to control the number of the pressure reducing conduits in line, the element is controlled by rotation and/or longitudinal position in order to connect or disconnect conduits. Preferably, the central control element comprises conduits for fluid selectable so as to connect or disconnect spirals, by rotation and/or longitudinal movement of the control element, by blocking or matching flow bores of the spiral shaped elements with flow bores or restrictions of the control element. The control element is preferably coupled to an actuator arranged so as to control the longitudinal and/or rotational position of the control element, which embodiment is for choke or control valves for which accurate control is critical, such as wellhead choke valves. Alternative embodiments have fixed pressure reduction or variable pressure reduction by manually decoupling or replacement of the spirals. An alternative control mechanism includes coupling two or more spiral shaped conduits in parallel, thereby reducing the flow restriction by increasing the number of parallel flows. The number of parallel spirals can be controlled by moving a control element such as a central plug, rod or cone in or out.

The spiral conduit cross sectional area may be circular, rectangular, squared or have any other form serving the purpose of allowing fluid to flow in a spiraling conduit.

The differential pressure between neighbor conduits connected in series is small, allowing little or no sealing between spiral conduits and bore openings of a central control element connecting or disconnecting neighbor spiral conduits. Also the control element is preferably balanced, by having the conduits connected at right angle, 90°, to the longitudinal axis of the element, thereby avoiding forces pushing the element out or in.

The valve of the invention preferably has length of the connected spiral-shaped conduit in the range 0.1 m to 500 m, more preferably 0.2 to 200 m, most preferably 0.5 to 100 m.

The flow cross section of each one of N spiral shaped conduits is preferably from 100/N % to 5/N % of the upstream and downstream nominal flow cross section area, more preferably 90/N % to 5/N %, even more preferable 80/N % to 5/N % of said nominal cross section area. If all N conduits of cross section are in line, the flow cross section is preferably 100% of the nominal flow cross section The pressure reduction of the valve or device of the invention is from 1 bar to 1000 bar differential pressure over the valve or device, more preferable 1-500 bar, even more preferable 1-200 bar differential pressure over the valve or device. For a given pressure reduction, the valve or device of the invention comprises longer conduits having larger cross section area for flow than prior art valves or devices, preferably several times longer and larger, respectively.

The invention also provides the combination of a pressure reduction valve and a separator, distinctive in that the valve is arranged upstream of the separator, and the valve comprises: at least one relatively long flow bore conduit shaped as a spiral or a spiral arranged on the surface of a cone or frustum, said spiral shaped conduit includes at least one, preferably at least three rotations and each spiral shaped conduit preferably is closely packed; the conduit has been arranged between the inlet and the outlet, has reduced flow cross section area, and the length, the cross section area and the number of the conduits in line determine the pressure reduction of a given fluid at a given flow rate The valve or device of the invention also represents an effective solution to reduce problems connected to particle erosion, cavitation erosion and noise which all are physical phenomena connected to particularly the velocity of a fluid. With the valve or device of the invention the velocity of the flowing fluid can be reduced to any desired level or limit by adoption of conduit cross sectional flow area and spiral length, in combination providing the desired pressure drop across the spiral conduit. Next, the required flow rate is accommodated by the number of parallel spiral conduits.

Controlling particle erosion is highly relevant in many petroleum applications where valves or other throttling devices are heavily exposed to sand. Choke and control valves are typical examples of such applications. EP 0520567 A1, EP1639285 B1 and U.S. Pat. No. 4,292,991 are examples of valve solutions which are claimed to have increased erosion resistance. One particular application is valves used in sand treating systems, for example when reducing pressure of a water/sand or oil/sand flow from a separator or in a process where sand is circulated for the purpose of cleaning the sand.

Examples of valves which shall have reduced cavitation are given by EP1794483 B1 and U.S. Pat. No. 4,149,563.

FIGURES

Figure 2:
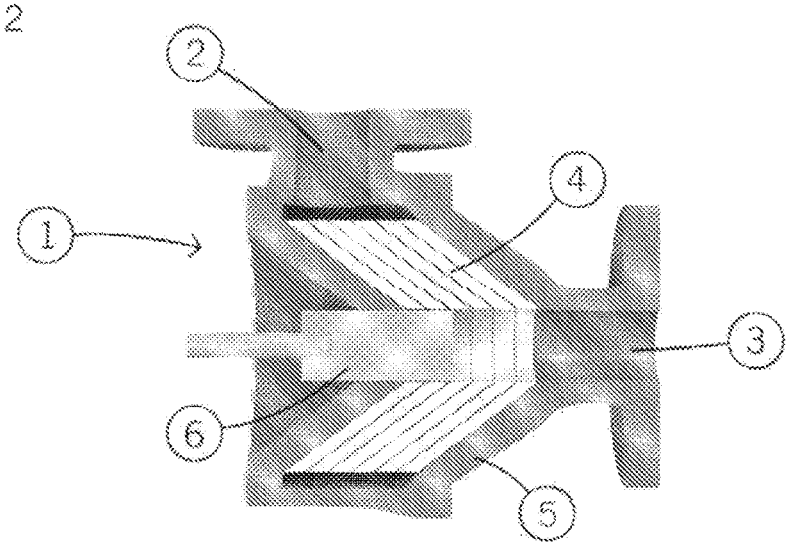
Figure 3A:
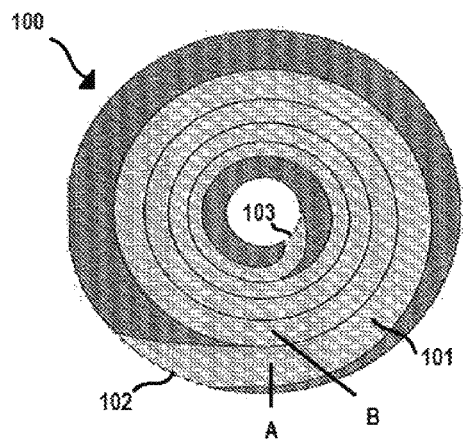
Figure 3B:
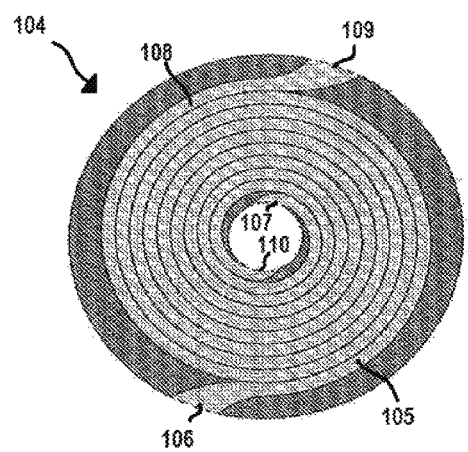
Figure 3C:
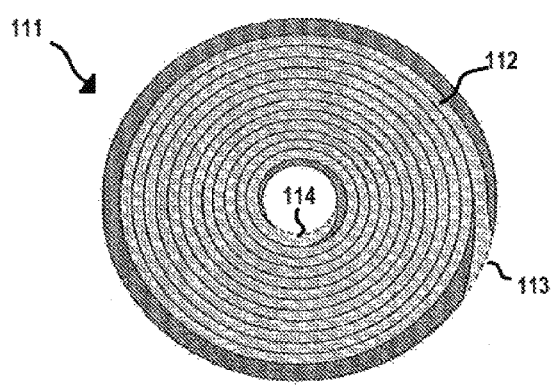
Figure 3D:
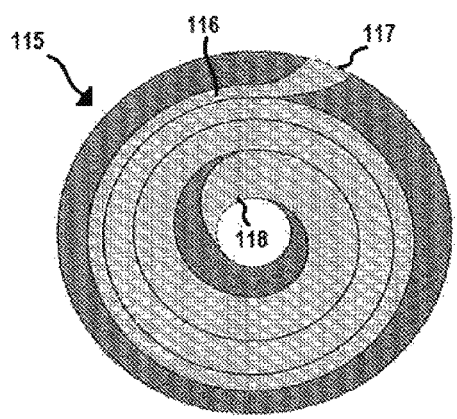
Figure 4:
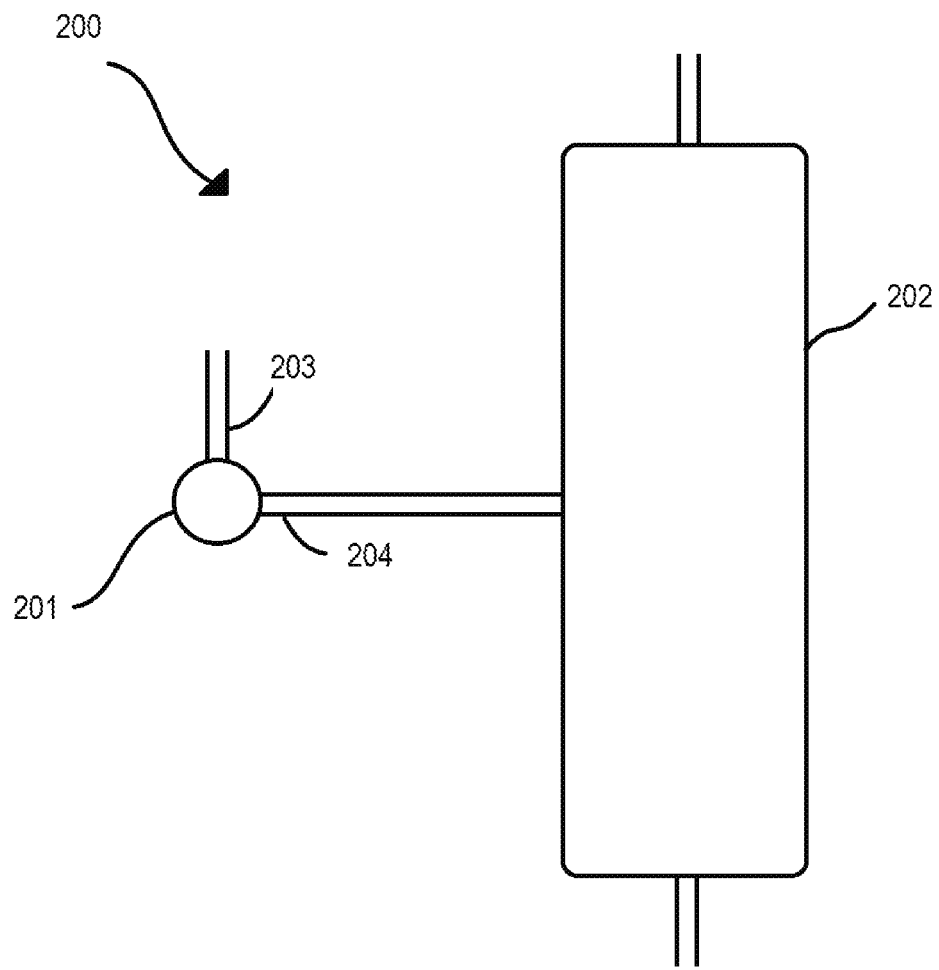

The invention is illustrated with three figures, of which:

FIG. 1 illustrates a spiral shaped conduit arrangement of a valve of the invention, FIG. 2 illustrates a "conical spiral" conduit arrangement of a valve of the invention, FIGS. 3A-3D illustrate cross-sectional views of spiral shaped conduits of valves of the invention, and FIG. 4 illustrates a valve positioned upstream relative to a separator.

DETAILED DESCRIPTION

Reference is made to FIG. 1 illustrating a spiral shaped conduit arrangement of a valve of the invention. More specifically, the valve 1 has an inlet 2, an outlet 3, and a number of spiral shaped conduits 4 arranged in parallel in a valve housing 5. A central control element 6 controls the number of spiral shaped conduits coupled in parallel, from all to any number down to 0, thereby controlling the flow rate or pressure of the fluid. At a given flow rate the pressure reduction is at a minimum level when all elements are coupled in parallel, and it increases towards a maximum when reducing the number of spiral elements in line. The control element is controlled by axial movement, manually or by an actuator. For clarity, the spiral shaped conduits are not illustrated in full detail.

Reference is made to FIG. 2 illustrating a "conical spiral" conduit arrangement of a valve of the invention. Again, the valve 1 has an inlet 2 and an outlet 3, but the number of conduits 4 have been arranged as conical spirals or conduits in parallel in a valve housing 5, the number of conical spiral inline or coupled controllable by a central control element 6 as or the pure spiral shaped embodiment illustrated in FIG. 1.

Further reference is made to FIGS. 3A-3D that illustrate cross-sections of valves 100, 104, 111, and 117, respectively. Each of the valves 100, 104, 111, and 117 includes spiral-shaped conduits. Each of the valves 100, 104, 111, and 117 includes more than one spiral conduit rotation, contrary to prior art valves. A spiral conduit rotation comprises a portion of the spiral conduit that completes a 360° rotation. An example of a spiral conduit rotation is illustrated by a portion of a spiral-shaped conduit 101 of the valve 100 marked between a point A and a point B. Referring now to FIG. 3A, the valve 100 includes the spiral-shaped conduit 101. The spiral-shaped conduit 101 has a length that spans between an inlet 102 and an outlet 103. As shown in FIG. 3A, a cross-section of the spiral-shaped conduit 101 decreases from the inlet 102 to the outlet 103. The inlet 102 may be coupled to an inlet of a valve, such as, for example, the inlet 2 of the valve 1. The outlet 103 may be coupled to an outlet of a valve, such as, for example, the outlet 3 of the valve 1.

Referring now to FIG. 3B, the valve 104 includes a spiral-shaped conduit 105 and a spiral shaped conduit 108. As illustrated in FIG. 3B, the sprial-shaped conduit 105 and the spiral-shaped conduit 108 wrap around one another. The spiral-shaped conduit 105 has a length that spans between an inlet 106 and an outlet 107. The spiral-shaped conduit 108 has a length that spans between an inlet 109 and an outlet 110. Similar to the valve 100, the inlet 106 and the inlet 109 may be coupled to a valve inlet, such as, for example, the inlet 2 of the valve 1.

Referring now to FIG. 3C, the valve 111 includes a spiral-shaped conduit 112. The spiral-shaped conduit 112 has a length that spans between an inlet 113 and an outlet 114. The inlet 113 may be coupled to an inlet of a valve, such as, for example, the inlet 2 of the valve 1. The outlet 114 may be coupled to an outlet of a valve, such as, for example, the outlet 3 of the valve 1.

Referring now to FIG. 3D, the valve 115 includes a spiral-shaped conduit 116. The spiral-shaped conduit 116 has a length that spans between an inlet 117 and an outlet 118. The inlet 117 may be coupled to an inlet of a valve, such as, for example, the inlet 2 of the valve 1. The outlet 118 may be coupled to an outlet of a valve, such as, for example, the outlet 3 of the valve 1. As shown in FIG. 3D, a cross-section of the spiral-shaped conduit 116 increases from the inlet 102 to the outlet 103.

Preferably, each spiral has three or more rotations, such as five or ten rotations. A spiral is a winding, circling or revolution, in the claim termed rotations, of the conduit in this case, around a central point, the conduit getting closer or further away from the central point by each rotation. Accordingly, the term spiral implies at least one rotation, since the conduit must be wound around the central point. Each spiral arranged as a disc or cone surface section element, is closely packed, meaning that there is no undue space between conduits in a spiral, as illustrated. Furthermore, the spiral shaped discs or elements are preferably closely packed, providing superior technical effect at a minimum of space or volume.

Referring now to FIG. 4, a schematic of a system 200 is shown. The system 200 includes a valve 201 and a separator 202. Any of valves 1, 100, 104, 111, and 115 may be used in place of the valve 201. The valve 201 includes an inlet 203 and an outlet 204. The outlet 204 is coupled to the separator 202.

As clear from the description above, numerous alternative features or embodiments are possible and sometimes preferable. The valve or device of the invention can comprise any features as described or illustrated in this document, in any operative combination and each such operative combination is an embodiment of the invention.

The invention claimed is:

1. A flow and fluid conditioning pressure reduction device comprising:
   an inlet and an outlet;
   wherein the pressure reduction device comprises at least two spiral-shaped flow bore conduits, each of the at least two spiral-shaped flow bore conduits arranged on a surface of a cone or frustum, each of the spiral-shaped flow bore conduits winding around a central point of the cone or frustum so that each rotation of the spiral-shaped flow bore conduits brings each spiral-shaped flow bore conduit closer to or further away from the central point, and each of the at least two spiral-shaped flow bore conduits having a length that extends from an inlet of each spiral-shaped flow bore conduit to an outlet of each spiral-shaped flow bore conduit, the length being of at least 0.1 m and forming at least one spiral conduit rotation; and wherein the inlet of each of the at least two spiral-shaped conduits is coupled to the inlet of the pressure reduction device and the outlet of each of the at least two spiral-shaped conduits is coupled to the outlet of the pressure reduction device; and wherein the length of each of the at least two spiral-shaped flow bore conduits, a cross-sectional area of each of the at least two spiral-shaped flow bore conduits, and a number of the at least two spiral-shaped flow bore conduits that are in-line determines a pressure reduction of a fluid at a given flow rate as the fluid flows through the pressure reduction device.

2. The pressure reduction device according to claim 1, wherein the at least two spiral-shaped flow bore conduits are packed close together and are connected in either parallel or series or in a combination of parallel or series.

3. The pressure reduction device according to claim 1:
wherein the at least two spiral-shaped flow bore conduits are packed close together and are connected in either parallel or series or in a combination of parallel or series; and
wherein an apex of the cone or frustrum forms a right angle.

4. The pressure reduction device according to claim 1, wherein the length of each of the at least two spiral-shaped flow bore conduits is between 0.1 m to 500 m.

5. The pressure reduction device according to claim 1, further comprising a central control element adjustable to control at least one of the length and a number of the at least two spiral-shaped flow bore conduits in line, wherein a rotational and longitudinal position of the central control element determines the number of the at least two spiral-shaped flow bore conduits.

6. The pressure reduction device according to claim 5, wherein the central control element comprises conduits for fluid to selectively connect or disconnect a spiral conduit rotation of the at least two spiral-shaped flow bore conduits by at least one of rotational and longitudinal movement of the central control element.

7. The pressure reduction device according to claim 6, wherein the central control element is coupled to an actuator arranged to control at least one of the longitudinal and rotational position of the central control element.

8. The pressure reduction device according to claim 1, wherein the cross-sectional area is circular, square, rectangular, or triangular.

9. The pressure reduction device according to claim 1, wherein each of the at least two spiral-shaped flow bore conduits comprises at least three rotations.

10. The pressure reduction device according to claim 1, wherein the length of each of the at least two spiral-shaped flow bore conduits is between 0.2 and 200 m.

11. The pressure reduction device according to claim 1, wherein the length of each of the at least two spiral-shaped flow bore conduits is between 0.5 and 100 m.

12. The pressure reduction device according to claim 1, wherein the pressure reduction device comprises a valve.

13. A system comprising:
a separator; and
a pressure reduction device coupled to the separator and arranged upstream relative to the separator, the pressure reduction device comprising:
an inlet and an outlet;
wherein the pressure reduction device comprises at least two spiral-shaped flow bore conduits, each of the at least two spiral-shaped flow bore conduits arranged on a surface of a cone or frustum, each of the spiral-shaped flow bore conduits winding around a central point of the cone or frustum so that each rotation of the spiral-shaped flow bore conduits brings each spiral-shaped flow bore conduit closer to or further away from the central point, and each of the at least two spiral-shaped flow bore conduits having a length of at least 0.1 m and forming at least one spiral-conduit rotation;
wherein each of the at least two spiral-shaped conduits comprises an inlet coupled to the inlet of the pressure reduction device and an outlet coupled to the outlet of the pressure reduction device; and
wherein a length of each of the at least two spiral-shaped flow bore conduits, a cross-sectional area of each of the at least two spiral-shaped flow bore conduits, and a number of conduits disposed in the pressure reduction device determines a pressure reduction of a fluid at a given flow rate as the fluid flows through the pressure reduction device.

14. The system according to claim 13, wherein each of the at least two spiral-shaped flow bore conduits comprises at least three rotations.

15. The system according to claim 13, wherein the length of each of the at least two spiral-shaped flow bore conduits is between 0.2 and 200 m.

16. The system according to claim 13, wherein the length of each of the at least two spiral-shaped flow bore conduits is between 0.5 and 100 m.

17. The system according to claim 13, wherein the pressure reduction device comprises a valve.

* * * * *